United States Patent [19]
Traut

[11] Patent Number: 5,083,396
[45] Date of Patent: Jan. 28, 1992

[54] CROP PROTECTION SYSTEM

[76] Inventor: Emma L. Traut, R.R. 4, Lakeshore Place, Kelowna, British Columbia, Canada, V1Y 7R3

[21] Appl. No.: 686,305

[22] Filed: Apr. 16, 1991

Related U.S. Application Data

[63] Continuation of Ser. No. 152,889, Feb. 5, 1988, abandoned.

[51] Int. Cl.$^5$ .................. A01G 13/10; A01G 13/00
[52] U.S. Cl. .................................. 47/28.1; 47/31
[58] Field of Search .............. 47/20, 21, 26, 28 R, 47/29, 30, 31, 54

[56] References Cited

U.S. PATENT DOCUMENTS

| | | | |
|---|---|---|---|
| 711,225 | 10/1902 | Putnam et al. | 47/28 |
| 805,814 | 11/1905 | Palmer | 47/31 |
| 1,106,624 | 8/1914 | Cadwallader | 47/20 |
| 2,039,522 | 5/1936 | De Land | 47/26 |
| 2,051,643 | 8/1936 | Morrison | 47/28 |
| 2,118,474 | 5/1938 | Morton | 135/93 |
| 2,143,659 | 1/1939 | Morrison | 47/28 |
| 2,401,997 | 6/1946 | Whitman | 47/31 |
| 3,100,950 | 8/1963 | Heuer | 135/87 |
| 3,352,058 | 11/1967 | Brant | 47/58 |
| 3,481,073 | 12/1969 | Yoshida et al. | 47/17 |
| 3,581,436 | 6/1971 | Basiger | 47/26 |
| 3,653,150 | 4/1972 | Howard | 47/29 |
| 3,932,958 | 1/1976 | Kistler, Jr. et al. | 47/28 R X |
| 4,296,568 | 10/1981 | Dukes | 47/20 |

FOREIGN PATENT DOCUMENTS

| | | | |
|---|---|---|---|
| 2643254 | 3/1978 | Fed. Rep. of Germany | 47/31 |
| 16948 | 5/1913 | France | 47/20 |
| 4127945 | 10/1979 | Japan | 47/DIG. 6 |
| 1010 | 1/1980 | Japan | 47/DIG. 6 |
| 238273 | 2/1969 | U.S.S.R. | 47/28 |
| 697691 | 9/1953 | United Kingdom | 47/31 |

OTHER PUBLICATIONS

The Botanical Gazette, vol 121, No. 1, 9/1959, pp. 1–8.

Primary Examiner—Robert A. Hafer
Assistant Examiner—Kevin G. Rooney
Attorney, Agent, or Firm—Pretty, Schroeder, Brueggemann & Clark

[57] ABSTRACT

A shelter to protect a crop from birds. The shelter comprises uprights including end uprights arranged in longitudinal rows in a crop area. There are guides on the top of each upright. A pair of upper main guide wires extend between tops of adjacent uprights in each longitudinal row and are located by the guides. Cross wires extending between adjacent end uprights. Monofilament nets extending between adjacent pairs of guide wires. The nets form a roof for the shelter and are secured to the cross wires. There are loops at the side of each net to engage the guide wires. Further monofilament nets are mounted in the cross wires and extend downwardly to form ends for the shelter. Other monofilament nets extend downwardly from each outer main upper guide wire of the shelter to form sides for the shelter. The nets are effective in preventing birds reaching the crop, durable yet inexpensive.

13 Claims, 1 Drawing Sheet

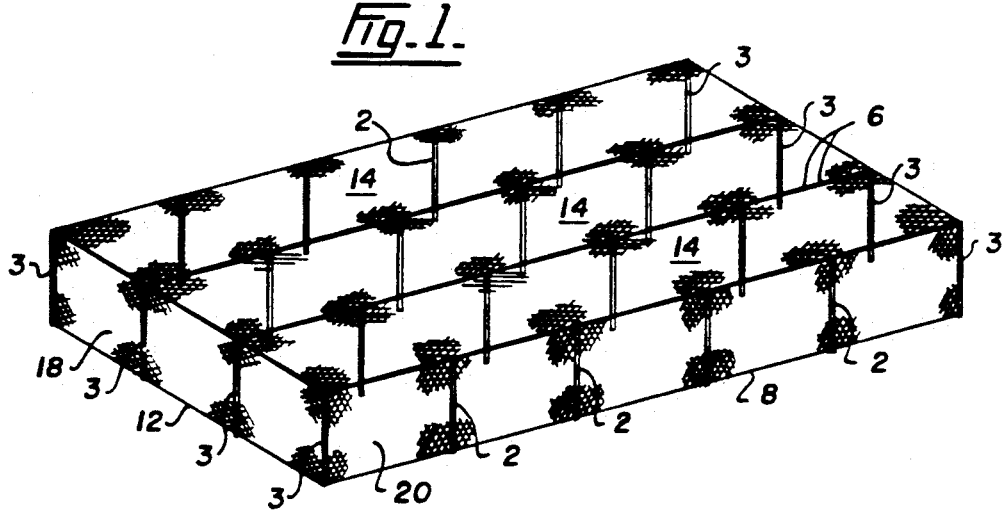
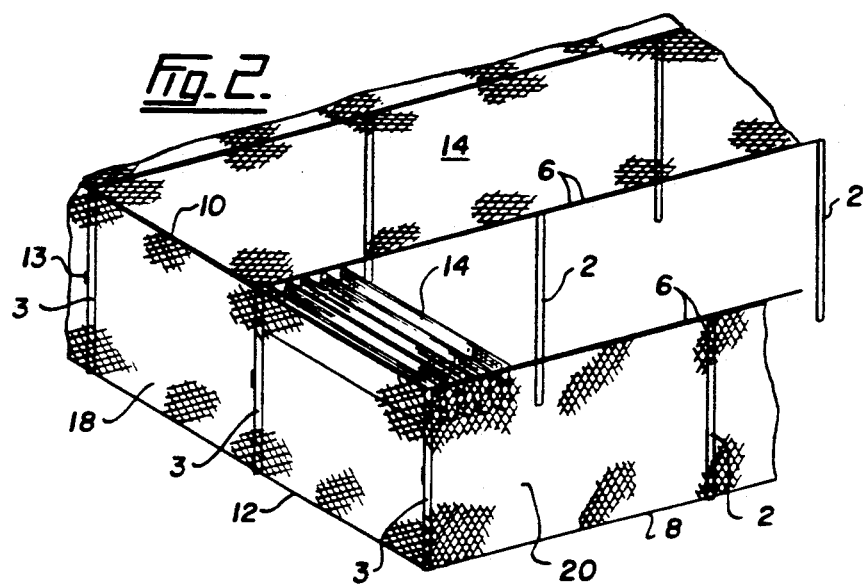
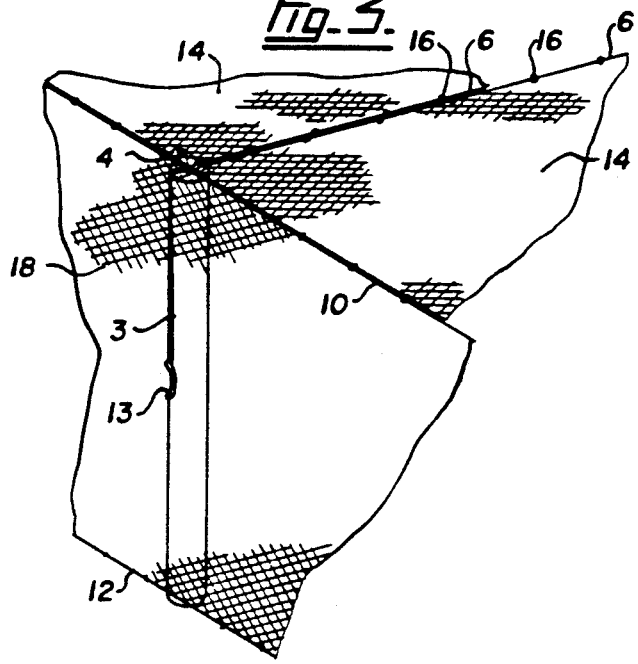

CROP PROTECTION SYSTEM

This is a continuation of application Ser. No. 07/152,889, filed on Feb. 5, 1988, now abandoned.

FIELD OF THE INVENTION

This invention relates to a shelter to protect a crop from birds. The invention finds particular application in the protection of grapes.

DESCRIPTION OF THE PRIOR ART

The taking of crops by birds is a well known hazard in any agricultural community. Any crop is susceptible but the taking of ripe berries, particularly grapes, by birds is well known. A blackbird or starling can eat about a half pound of fruit per day. These birds forage in flocks of about 10,000 to 20,000 so that tons of grapes can easily be lost in a short time. It is not unknown for a farmer to lose 100% of the crop to birds.

Needless to say a variety of methods have been used in an attempt to discourage the birds. Superficial poisoning of the crop by spraying, the use of noise alarms, shooting of the birds and the like are all well known. In Europe and Asia, in orchards, vineyards and in rice fields, it is known to use netting. Usually the nets are just thrown over the plants and tied to the ground. This method is effective but only for a short time. The netting is soon inextricably bound up with the new twigs and branches and, as an example, every year the net will be removed to allow access to the crop. Removal frequently damages the net. In addition new twigs and branches force their way through the net so that the birds may eat the fruit. Furthermore the longevity of such previous netting, typically old fish nets and the like, is slight. Two to three years would be as much as one could expect even if the net had not become a hindrance to harvesting by that time.

Examples of prior patents illustrating the use of nets in protecting crops are Heuer U.S. Pat. No. 3,100,950; Whitman U.S. Pat. No. 2,401,997; Morton U.S. Pat. No. 2,118,474; Brant U.S. Pat. No. 3,352,058; De Land U.S. Pat. No. 2,039,522; Basinger U.S. Pat. No. 3,581,436; and Cadwallader U.S. Pat. No. 1,106,624. Generally the above patents disclose the use of nets to protect crops but they do so in a way that is relatively complicated and expensive and in a way that has not found commercial application, either because of the expense of the structures involved or the lack of durability.

SUMMARY OF THE INVENTION

The present invention seeks to provide a shelter to protect a crop from birds that is relatively cheap to install, able to last at least ten and probably fifteen years, and to provide complete protection from birds.

Accordingly the present invention provides a shelter to protect a crop from birds the shelter comprising a plurality of uprights including end uprights arranged in longitudinal rows in a crop area; guide means on the top of each upright; a pair of upper main guide wires extending between tops of adjacent uprights in each longitudinal row and located by the guide means; first cross wires extending between adjacent end uprights; first monofilament nets extending between adjacent pairs of guide wires, the first nets forming a roof for the shelter and secured to the first cross wires; loops at the side of each first net to engage the guide wires; second monofilament nets mounted on the first cross wires and extending downwardly to form ends for the shelter; and third monofilament nets extending downwardly from each outer main upper guide wire of the shelter to form sides for the shelter.

In a particularly preferred embodiment the monofilament nets are polyethylene, preferably of 400 denier and blue or yellow in colour.

DESCRIPTION OF THE DRAWINGS

Aspects of the invention are illustrated, merely by way of example, in the accompanying drawings in which:

FIG. 1 illustrates a shelter according to the present invention;

FIG. 2 is a detail of the shelter of FIG. 1; and

FIG. 3 illustrates a further detail of the shelter of FIG. 1.

DESCRIPTION OF THE PREFERRED EMBODIMENTS

The drawings show a shelter to protect a crop from birds. The shelter comprises a plurality of uprights 2 and end posts 3 arranged in longitudinal rows in a crop area. There are guide members that include readily engageable and disengageable means for retaining the main guide wire on the top of each upright 2 and 3. In an illustrated embodiment the readily engageable and disengageable means comprise V members 4 extending upwardly from the top of each upright 2 and 3. There are a pair of upper main guide wires 6 extending between adjacent uprights 2 and 3 in each longitudinal row and located by the V members 4.

There is a single main lower guide wire 8 extending between the bases of adjacent uprights 2 in the outer longitudinal rows.

First cross wires 10 extend between the tops of adjacent end posts 3 and are located by the V members 4. There are second cross wires 12 extending between the base of adjacent end posts 3. The guide wires 6 and cross wires 10 are anchored, as shown particularly in FIG. 3, by the provision of cleats 13 on the end posts 3.

First monofilament nets 14, as shown particularly in FIG. 2, extend between adjacent pairs of guide wires 6. The first nets 14 form a roof for the shelter. There are loops 16, as shown particularly in FIG. 3, at each side of each first net 14 to engage the guide wires 6. Second monofilament nets 18 extend between first and second cross wires 10 and 12 to form ends for the shelter and third monofilament nets 20 extend between neighbouring main upper guide wires 6 and main lower guide wire 8 to form sides to the shelter.

The uprights 2 should be of sufficient height not merely to allow growth of the vines but also to allow machinery to work within the shelter. A height of about 4 meters has been found desirable. The end posts 3 are usually more robust than the other uprights 2 as the end posts 3 stand the greater load. The uprights 2 and 3 in the longitudinal rows are desirably arranged at about 40 meter intervals.

In a particularly preferred embodiment the monofilament nets are of polyethylene of about 400 denier and are either blue or yellow in colour. The mesh of the net is not particularly important and generally will be chosen to exclude all birds. A mesh of 25 mm to 45 mm has been found desirable. Polyethylene monofilaments are light in weight, easy to handle and resistant to the sun's rays. It has also been observed that the blue and yellow colour acts as a deterrent to the birds so that after some time they do not even approach the nets. This avoids the problem of the birds becoming trapped in the nets.

To install the shelter of the present invention the uprights 2 and 3, which may be pipes or posts, are installed according to the pattern shown in FIG. 1 in the crop area. The uprights 2 and 3, are of the appropriate length and at the appropriate separation as outlined above. These dimensions ensure that the netting does not interfere with the growing of the crop, with workers attending to the crops or with tractor work, spraying, irrigation and the like that takes place in any modern agriculture. The upper main guide wires 6 are laid along the rows, on the ground, from one end to the other and the cross wires 10 and 12 for the upper end and the lower end of the rows are laid on the ground. A first monofilament net 14 is extended and a main guide wire 6 is pushed through the loops 16 on one side of the net 14. The wire 6 is then secured to an end post 3, using a cleat 13. The other edge of the net 14 is then located on the other main guide wire 6 which is then installed on the neighbouring upright 2 again using a cleat 13. The main wires 6 are then hooked over the guides 4 along the line down to the other end of the shelter and secured there to the outer upright 2. The net is then opened and stretched down the row and secured to the cross wires 10. To move the loops 16 around a guide the wire 6 is removed from the guide. The wires 6 and 10 are stretched as tightly as possible so the net can not sag and are then re-secured to the end posts 3, again using the cleats 13. If the row is more than 50 meters long it is desirable to add further nets. In those circumstances the adjacent ends of nets are joined together so that no opening remains where birds can get through. Once the planned area has been covered with nets all the sides are closed with nets 20. The loops 16 of nets are slipped over the wire 6, as described above, and located on the guides 4. The net 20 is allowed to hang down to the ground and is then secured to the single main lower guide wire 8. This is repeated on each side of the shelter. The same procedure is then repeated at each end of the shelter with nets 18.

The arrangement is such that the nets can be drawn back, as shown, for example, in FIG. 2 for the roof.

In installing the net it is desirable to ensure that there are no gaps. This can be ensured by the use of stitching of adjacent nets together although this is not normally necessary. The net covering the side should extend as low as possible and, if necessary, may be secured to the ground by for example, prongs, or the wires secured to the posts. Similarly wires 10 can simply be looped and tied around end posts 3. Wires 10 are to stop longitudinal slipping of the net.

The shelter of the present invention has a number of great advantages over the prior art. For reasons that are not entirely clear the birds do not attempt to get through the net after several unsuccessful efforts. The blue and yellow colour of which the net is preferably made appears to assist in this deterrent effect. The other factor may be that the birds recognize the nets by their colour and recognize them as being impregnable. The shelter does not shrink. Durability tests indicate that the shelter is available for protection for 15 years. As the net is relatively cheap this represents a tremendous saving compared with prior art protection systems. The net is light and can easily be handled. Furthermore once the season is over the nets can be pushed back so that they do not gather snow, which can have a deleterious effect by providing additional, unwanted weight on the nets. Furthermore the nets are so fine that their blocking of the sunrays is negligible.

Because the nets can slide along the guide wires the harvesting can be carried out simply by allowing the pickers to enter the system and then close the net behind them. In prior art systems it is necessary to remove the net thus rendering the crop particularly vulnerable when the berries are most attractive to birds.

The nets do not shrink so that in the next growing season it is simply necessary to extend the nets to the desired position at the start of the season.

Grapes have been examplified as the crop because successful experimental work has been conducted on that crop. However, the system can be used to protect blueberries, cherries, peaches, apricots, strawberries, blackberries, raspberries, sunflowers, plums and even apples.

I claim:

1. A shelter to protect a crop from birds, the shelter comprising:
   a plurality of uprights including end uprights arranged in longitudinal rows in a crop area;
   guide members on the top of each upright;
   a pair of upper main guide wires extending between tops of adjacent uprights in each longitudinal row and located by the guide members;
   first cross wires extending between adjacent end uprights;
   first monofilament nets extending between adjacent pairs of the guide wires, the first nets forming a roof for the shelter and being secured to the first cross wires;
   loops at the side of each first net, each loop engaging a first net and slideably securing the net to a guide wire;
   second monofilament nets mounted on the first cross wires and extending downwardly to form ends for the shelter; and
   third monofilament nets extending downwardly from each outer main upper guide wire of the shelter to form sides for the shelter;
   said guide members including readily engageable and disengageable means for engaging and disengaging said main guide wires on the tops of said uprights permitting said loops to move along said guide wires when said readily engageable and disengageable means disengage said main guide wires thereby allowing movement of said first monofilament nets along said guide wires.

2. A shelter as claimed in claim 1 in which the uprights are of sufficient height to allow machinery to work within the shelter.

3. A shelter as claimed in claim 1 in which the readily engageable and disengageable means of said guide member comprises grooves in the top of each upright.

4. A shelter as claimed in claim 1 in which the readily engageable and disengageable means of said guide member comprises V shaped members extending upwardly from the top of each upright.

5. A shelter as claimed in claim 1 in which the uprights in longitudinal rows are arranged at about 40 meter intervals.

6. A shelter as claimed in claim 1 in which the monofilament nets are of polyethylene.

7. A system as claimed in claim 6 in which the monofilament polyethylene is 400 denier.

8. A system as claimed in claim 6 in which the polyethylene monofilament is blue or yellow.

9. A system as claimed in claim 1 in which the net is of 25 mm to 45 mm mesh.

10. A system as claimed in claim 1 in which the loops at each side of each net are woven into the net.

11. A shelter as claimed in claim 1 including anchors on the end uprights to anchor the main guide wires.

12. A shelter as claimed in claim 1 including a main lower guide wire extending between the base of adjacent uprights in the outer longitudinal row to receive the third monofilament nets.

13. A shelter as claimed in claim 1 including second cross wires extending between adjacent end posts to receive the second monofilament nets.

* * * * *